United States Patent
Criscione et al.

(10) Patent No.: US 7,997,520 B2
(45) Date of Patent: Aug. 16, 2011

(54) CABLE SPOOL WITH HEIGHT ADJUSTMENT CAPABILITY AND METHOD OF PERFORMING THE SAME

(75) Inventors: Steven F Criscione, Raleigh, NC (US); Clifford T Jones, Raleigh, NC (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/437,685

(22) Filed: May 8, 2009

(65) Prior Publication Data
US 2010/0282891 A1 Nov. 11, 2010

(51) Int. Cl.
*B65H 75/44* (2006.01)
*G02B 6/08* (2006.01)

(52) U.S. Cl. .............. 242/400.1; 385/135; 191/12.2 R

(58) Field of Classification Search ............... 242/400.1; 385/134–138; 191/12.2 R
See application file for complete search history.

(56) References Cited

U.S. PATENT DOCUMENTS

| | | | | |
|---|---|---|---|---|
| 4,722,585 A * | 2/1988 | Boyer | .......................... | 385/135 |
| 5,066,149 A * | 11/1991 | Wheeler et al. | ............... | 385/135 |
| 5,724,469 A * | 3/1998 | Orlando | ......................... | 385/135 |
| 5,907,654 A * | 5/1999 | Render et al. | ................... | 385/135 |
| 6,208,797 B1 * | 3/2001 | Vanderhoof et al. | .......... | 385/135 |
| 6,481,662 B1 * | 11/2002 | Kles et al. | ................... | 242/400.1 |
| 6,643,444 B1 * | 11/2003 | Putnam | ........................ | 385/135 |
| 6,814,328 B1 * | 11/2004 | Li et al. | ....................... | 242/400.1 |
| 2002/0181923 A1 * | 12/2002 | Wojcik | ........................... | 385/135 |

* cited by examiner

*Primary Examiner* — Sang Kim
(74) *Attorney, Agent, or Firm* — RG & Associates

(57) ABSTRACT

A spool and method of adjusting the same are disclosed. The spool is configured to provide a retainer for cable. The may include an upper flange, a lower flange, a plurality of access slots, a center portion, and a plurality of support legs. The support legs are configured to support the spool at a first distance above a securing surface, the support legs being adjustable to provide at least one additional distance that is different from the first distance.

14 Claims, 5 Drawing Sheets

CABLE SPOOL WITH HEIGHT ADJUSTMENT CAPABILITY AND METHOD OF PERFORMING THE SAME

TECHNICAL FIELD OF THE INVENTION

This invention relates to a storage spool used with printed circuit boards (PCBs) and related uses, and, in particular, to an apparatus or method of selecting a height of the storage spool to provide a harness or retainer of the optical fiber to a PCB or the like.

BACKGROUND OF THE INVENTION

It is conventional to route information to and from electronic devices via fiber optic cables, especially, when large amounts of data needs to be transmitted. Typically, the electronic devices include printed circuit boards (PCBs) with various components used to process the transmitted and received signals. The components may include typical electronic and/or opto-electronic components, such as, transceivers, processors, etc.

Typically, one end of a fiber optic cable is fastened to the PCB by a connector that allows communication with an incoming or external fiber optic cable. A length of fiber optic cable may then extend from the connector to a device attached to the circuit board to permit data transmission therebetween.

However, fiber optic cable has physical limitations, for example, the amount of bending it can withstand without failure or breakage. This limitation on the amount of bending that the fiber optic cable can withstand prior to failure is known as the minimum bend radius. Due to this physical limitation, newer devices have been created to manage or harness the fiber optic cable to a PCB in such a manner to prevent over-bending of the fiber optic cable and reduce entanglement of the cable with adjacent components or boards, especially, during installation of the board.

Fiber optic cable may be used with inverse transition radiation (ITR) lasers. In this example, the extra length associated with the fiber pigtail coming from an ITR laser needs to be stored off the PCB and controlled with a minimum bend radius. In other words, the fiber needs to be off the board and away from high heat generating components so the fiber is not harmed. The fiber also needs to be stored in a manner that controls the minimum bend radius so the fiber is not harmed due to bending that exceeds that minimum bend radius.

However, such conventional fiber retaining devices are difficult to insert on the connector interface portion of the PCB, which, in turn, may damage or break the PCB. Furthermore, the extent to which the fiber retaining device extends outwardly from the circuit board (frontwards, backwards, etc.), when installed, can increase the effective thickness of the circuit board, interfere with installation, and damage adjacent components.

Optimized retention of a fiber optic cable to a circuit board may be necessary to keep up with the increasing need of fiber optic interfaces being installed on circuit boards. In addition, the height and positioning of the fiber optic cable is tantamount to proper positioning of the fiber optic cable against the PCB. For example, engineers may require a fiber spool that provides both a storage mechanism and a positioning mechanism when connecting the fiber optic cable to a PCB. Conventional fiber optic spools that are used for circuit board mounting purposes may be higher or lower than a preferred or otherwise optimal mounting position.

SUMMARY OF THE INVENTION

The present invention provides an apparatus and method of retaining a cable to a spool.

In one example embodiment of the present invention a spool is configured to provide a retainer for cable. The spool may include an upper flange, a lower flange, a plurality of access slots, a center portion, and a plurality of support legs configured to support the spool at a first distance above a securing surface. The support legs are adjustable to provide at least one additional distance that is different from the first distance.

Another example embodiment of the present invention may include a method of adjusting a height of a spool configured to provide a retainer for cable. The method may include adjusting a plurality of support legs configured to support the spool at a first distance above a securing surface. The adjusting includes removing at least one of a portion of each of the individual plurality of support legs, to shorten the portion of the plurality of support legs, and, removing at least a portion of the total plurality of support legs.

DETAILED DESCRIPTION OF THE DRAWINGS

Figure 1:
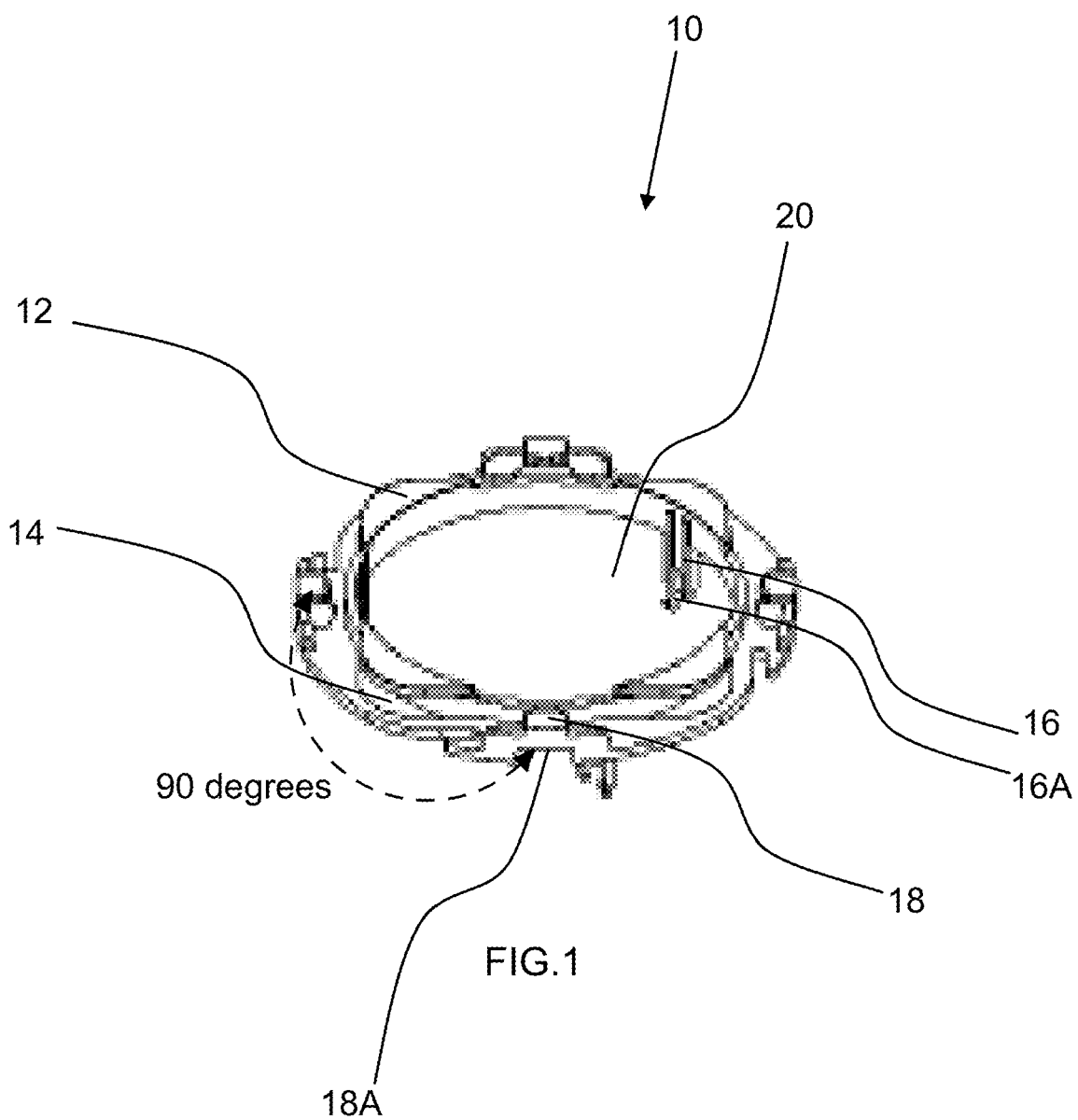
FIG. 1 illustrates an angled view of an example embodiment of the present invention.

FIG. 1 illustrates an angled view of an example embodiment of the present invention. Referring to FIG. 1, a fiber storage spool 10 is illustrated. The fiber storage spool 10 includes an upper flange 12, a lower flange 14, support legs 16 and support tabs 18 located above access slots 18A. A number of support legs 14 may be formed from or attached to a body portion of the fiber storage spool 10 to hold the fiber storage spool 10 to a PCB or the like. The fiber storage spool 10 provides a retainer for a length of fiber optic cable that is used with an associated PCB. As illustrated in FIG. 1, the access slots 18A may be spaced 90 degrees apart from each other around the periphery of the storage spool 10.

The fiber storage spool 10 may be constructed of steel or aluminum or a spring steel material by stamping, extruding, welding, punching, thermoforming or any suitable method. It will be understood that the retaining spool may be formed of any suitable material such as, for example, metal, plastic or polycarbonate.

In general, the storage spool 10 includes a rounded-spool shape. A center portion 20 of the spool 10 may be empty or may include a cover (not shown). The storage spool 10 may be limited by outwardly extending upper and lower flange portions 12 and 14 which provide a supporting wall to enclose the fiber optic cable. The center portion 20 may be cylindrical or may include a more elliptical or square-shape provided that an associated length of fiber optic cable is not forced to assume a smaller than desired bend radius, or, is not forced against a sharp bend or corner.

A plurality of support tabs 18 are provided along the outer periphery of the storage spool 10 to assist with retaining the fiber cable. Underneath the support tabs are access slots or holes 18A which provide an entrance slot for the fiber cable to enter the storage spool 10.

The support legs 16 are used to secure the fiber storage spool 10 to the PCB or the like. The support legs may include a foot portion 16A that curves at a particular angle outward or inward from the direction of the support leg 16. The foot portion 16A is used to snap into the PCB to provide a secure fit by pressing against the PCB. The spring coefficient of the material may provide a natural amount of pressure necessary to keep the foot portion 16A pressing securely against the PCB to minimize the likelihood that the storage spool 10 will loosen or release from the PCB.

Figure 2:
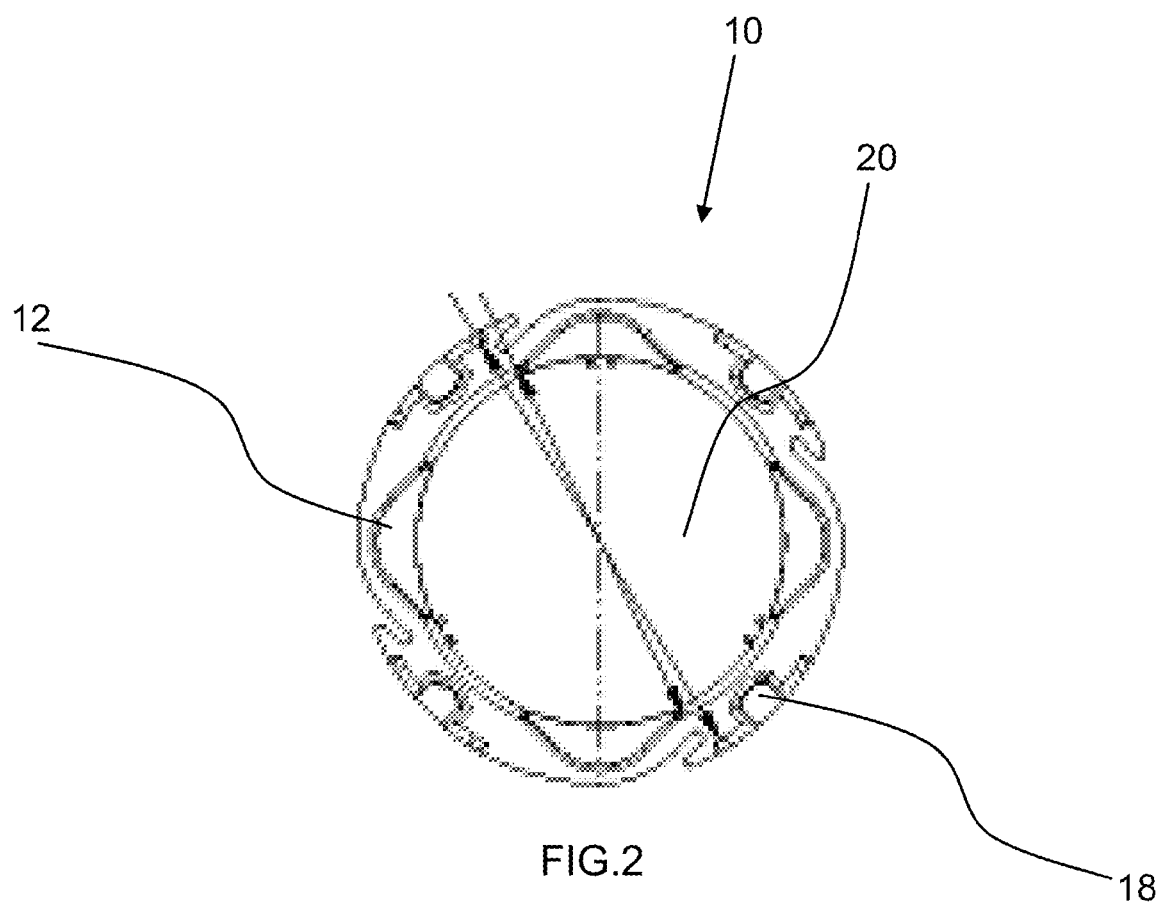
FIG. 2 illustrates a top view of an example embodiment of the present invention.

FIG. 2 illustrates a top view of the storage spool 10 according to an example embodiment of the present invention. For reference purposes, like numerals represent like components with regard to all of the drawings. Referring to FIG. 2, the arrows included in the center portion 20 illustrate how the inner diameter of the storage spool 10 is smaller than the outer diameter of the storage spool 10. The inner diameter represents the inside circumference of the spool and the outer diameter represents the outside circumference of the spool.

Figure 3:
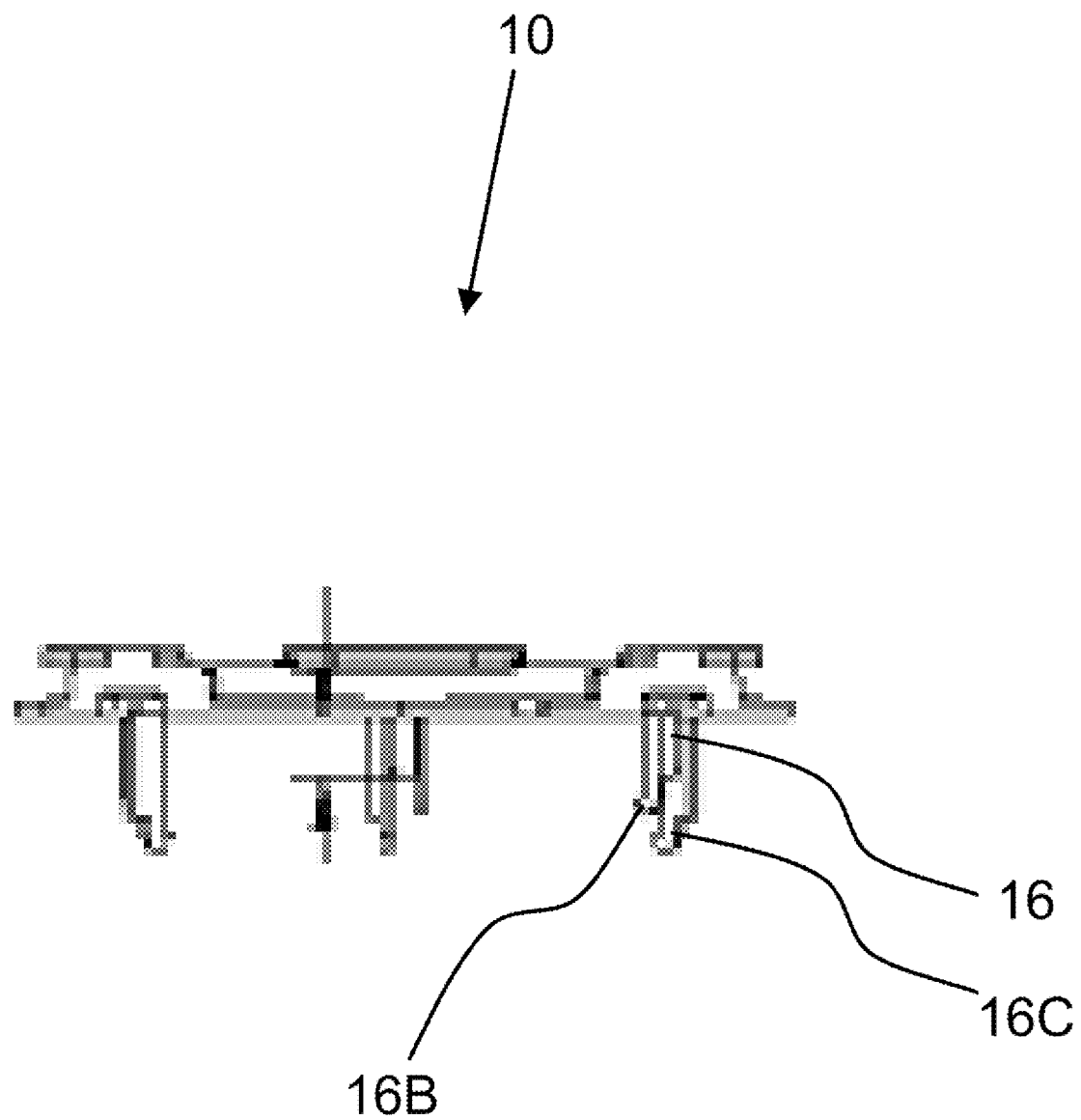
FIG. 3 illustrates a side view of an example embodiment of the present invention.

FIG. 3 illustrates a side view of the storage spool 10. According to one example embodiment of the present invention, the support leg 16 includes a single support leg portion with two separate foot portions 16B and 16C. In another example embodiment, there are two separate support legs each having different lengths and including their own respective foot portions. Both of these example embodiments are described with reference to FIGS. 4 and 5.

Figure 4:
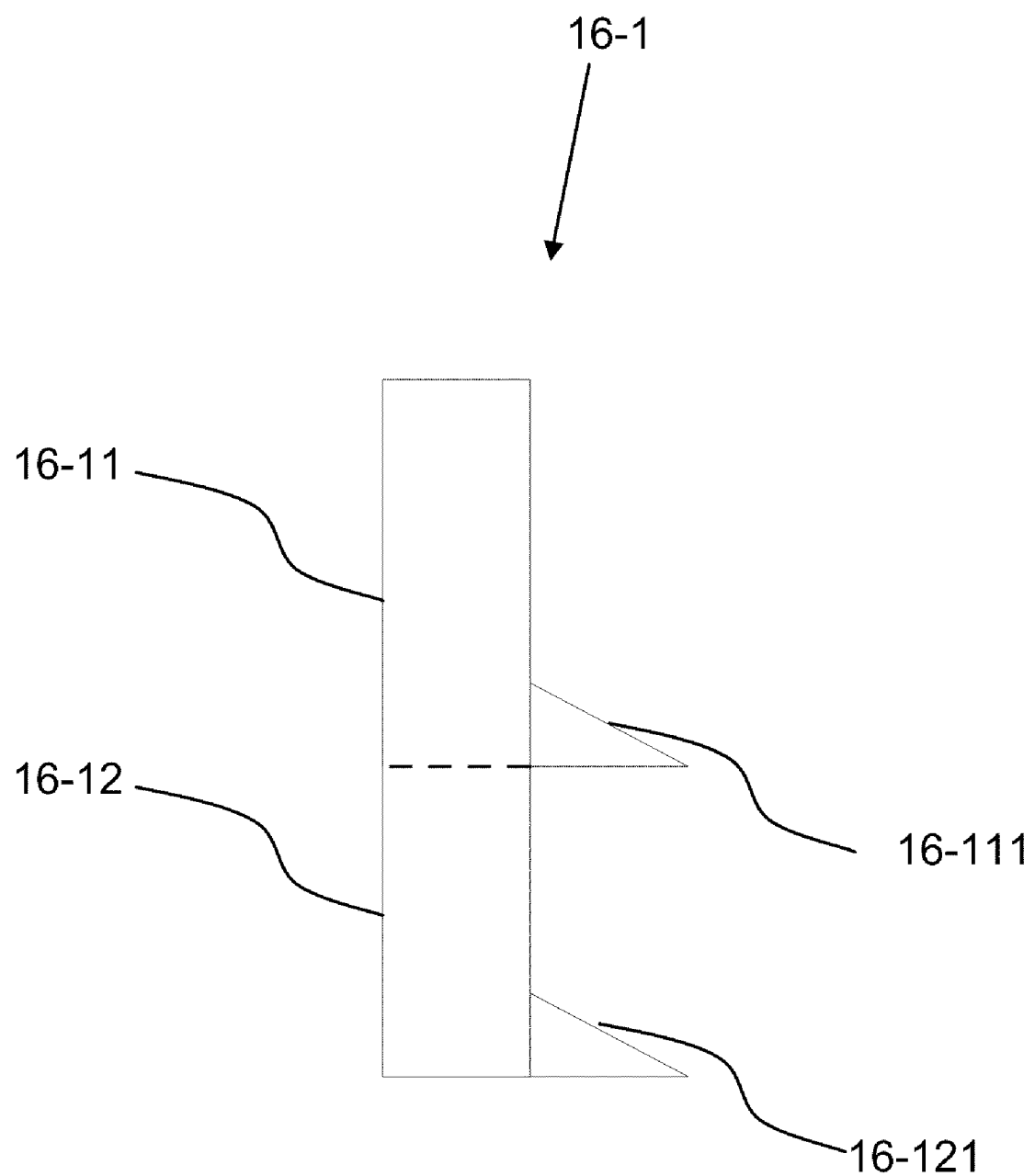
FIG. 4 illustrates an example embodiment of the support legs of the present invention.

FIG. 4 illustrates an example embodiment that includes a support leg 16-1 with two separate leg and foot portions. The first portion includes a first leg portion 16-11 and a corresponding first foot portion 16-111. In operation, if the engineer prefers to have the support leg length be shorter than the full length of both leg portions (i.e., 16-11 and 16-12), she could break off the bottom leg portion 16-12, which includes the bottom foot portion 16-121. Alternatively, if the engineer desires to have the support leg length be longer (i.e., the full length of both 16-11 and 16-12), then she may decide to leave the support leg 16-1 in tact and simply affix the bottom foot portion 16-121 directly into the PCB.

Snapping the bottom leg portion may be done by bending and breaking the leg at the dotted line where the leg may be manufactured to include a line or other indicia to flag the engineer to snap or cut the leg portion 16-1 at that particular junction.

Figure 5:
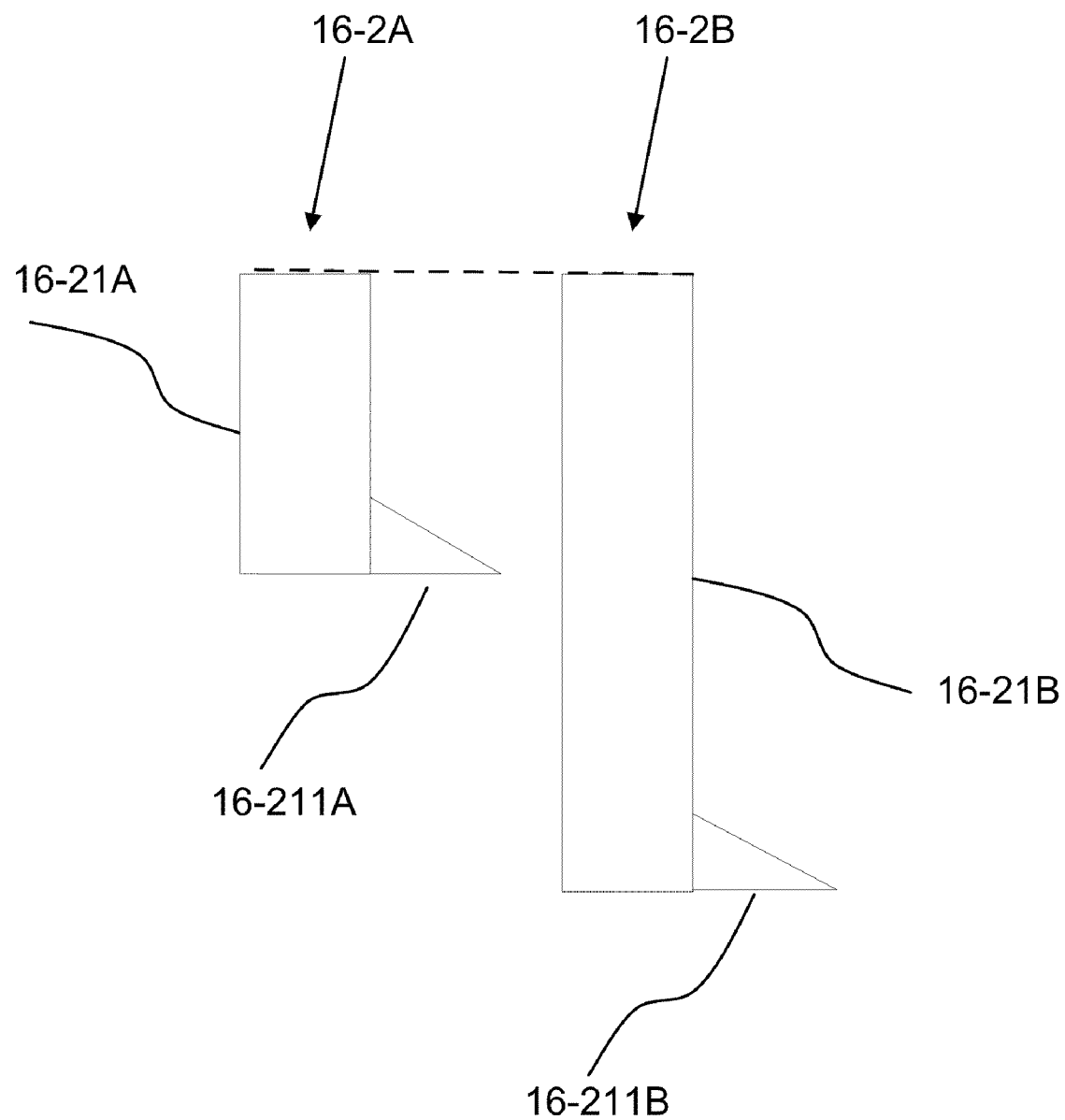
FIG. 5 illustrates another example embodiment of the the support legs of the present invention.

FIG. 5 illustrates another example embodiment that includes two separate support legs 16-2A and 16-2B. The first support leg 16-2A has a leg portion 16-21A and a foot portion 16-211A. The second support leg 16-2B has a corresponding leg portion 16-21B and a foot portion 16-211B. In this example embodiment, the longer leg 16-2B may be used without any action on the engineer's part. Both the shorter leg 16-2A and the longer leg portion 16-2B are already manufactured separately so that no action is necessary to prepare the longer support leg 16-2B to be mounted on a PCB. If, however, the engineer selects the shorter leg to be mounted on the PCB, then the longer leg 16-2B would have to be removed in order for the shorter leg 16-2A to make contact with the PCB.

In the embodiments described above, the storage spool 10 may be formed from a single blank of material or by a molding procedure. In such a case, the legs 16 and other elements of the storage spool can be formed or defined in one or more pressing, stamping or other suitable operation. Of course, other methods may be used to form the upper and lower flanges and other elements of the storage spool 10, such as, for example, welding, gluing, thermoforming, molding and so on.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A spool configured to provide a retainer for a cable, the spool comprising:
    an upper flange;
    a lower flange;
    a plurality of access slots;
    a center portion; and
    a plurality of support legs configured to support the spool at a first distance above a securing surface, at least a part of the plurality of support legs being removable to modify the first distance to become a second distance that is shorter than the first distance and wherein the second distance is used to support the spool at the second distance above the securing surface after the at least a part of the plurality of support legs is removed wherein the plurality of support legs each comprise a first leg portion and a bottom leg portion with a dotted line mid-point separating the first leg portion and the bottom leg portion, and wherein each of the bottom leg portions are removed by bending and breaking off the bottom leg portions to shorten each of the plurality of support legs to create a plurality of shorter support legs which are snapped into the securing surface to support the spool at the second distance above the securing surface.

2. The spool of claim 1, wherein the securing surface is a printed circuit board (PCB).

3. The spool of claim 1, wherein angles around a circumference of the spool are predefined to minimize the bend radius of the cable.

4. The spool of claim 1, wherein the cable is a fiber optic cable.

5. The spool of claim 1, wherein the cable enters the spool at any of the plurality of access slots located under the spool.

6. The spool of claim 5, wherein the plurality of access slots are spaced 90 degrees apart from one another.

7. The spool of claim 1, wherein the plurality of support legs comprises four support legs, the four support legs designed to be shortened by removing a portion of each of the four support legs to create four shorter support legs which are snapped into the securing surface for supporting the spool at the second distance above the securing surface.

8. A method of adjusting a height of a spool configured to provide a retainer for a cable, the method comprising:
    removing at least a part of at least one of a plurality of support legs that are supporting the spool a first distance above a securing surface, wherein the removing operation modifies the first distance to become a second distance that is shorter than the first distance and wherein the second distance is used to support the spool at the second distance above the securing surface after the at least a part of the at least one of the plurality of support legs is removed, wherein the plurality of support legs each comprise a first leg portion and a bottom leg portion with a dotted line mid-point separating the first leg portion and the bottom leg portion, and wherein removing each of the bottom leg portions is performed by bending and breaking off the bottom leg portions to shorten each of the plurality of support legs creating a plurality of shorter support legs; and snapping each of the plurality of support legs into the securing surface to support the spool at the second distance above the securing surface.

9. The method of claim 8, wherein the securing surface is a printed circuit board (PCB).

10. The method of claim 8, wherein angles around a circumference of the spool are defined to minimize a bend radius of the cable.

11. The method of claim 8, wherein the cable is a fiber optic cable.

12. The method of claim 8, wherein the cable enters the spool at any of a plurality of access slots located under the spool.

13. The method of claim 12, wherein the plurality of access slots are spaced 90 degrees apart from one another.

14. The method of claim 8, wherein the plurality of support legs comprises four support legs, and the adjusting comprises shortening the four support legs by removing a portion of each of the four support legs to create four shorter support legs which are snapped into the securing surface for supporting the spool at the second distance above the securing surface.

* * * * *